US 8,359,229 B2

(12) United States Patent
Bateni et al.

(10) Patent No.: US 8,359,229 B2
(45) Date of Patent: Jan. 22, 2013

(54) METHODS AND SYSTEMS FOR FORECASTING PRODUCT DEMAND DURING PROMOTIONAL EVENTS USING STATISTICAL CONFIDENCE FILTERS

(75) Inventors: Arash Bateni, Toronto (CA); Edward Kim, Toronto (CA); Philip Liew, Markham (CA); Jean-Philippe Vorsanger, Toronto (CA)

(73) Assignee: Teradata US, Inc., Dayton, OH (US)

( * ) Notice: Subject to any disclaimer, the term of this patent is extended or adjusted under 35 U.S.C. 154(b) by 1320 days.

(21) Appl. No.: 11/863,958

(22) Filed: Sep. 28, 2007

(65) Prior Publication Data
US 2009/0089143 A1 Apr. 2, 2009

(51) Int. Cl.
*G06Q 40/00* (2006.01)
(52) U.S. Cl. .................... 705/10; 705/7; 705/28
(58) Field of Classification Search ............... 705/7, 10, 705/28
See application file for complete search history.

(56) References Cited

U.S. PATENT DOCUMENTS

| 2002/0169657 | A1* | 11/2002 | Singh et al. .................. 705/10 |
| 2004/0098296 | A1* | 5/2004 | Bamberg et al. ............... 705/10 |
| 2005/0060245 | A1* | 3/2005 | Hoffman et al. ............... 705/28 |
| 2005/0096963 | A1* | 5/2005 | Myr et al. ...................... 705/10 |
| 2007/0050235 | A1* | 3/2007 | Ouimet .......................... 705/10 |
| 2008/0021765 | A1* | 1/2008 | Cereghini et al. .............. 705/10 |
| 2008/0077459 | A1* | 3/2008 | Desai et al. .................... 705/7 |

* cited by examiner

*Primary Examiner* — Nga B. Nguyen
(74) *Attorney, Agent, or Firm* — James Stover

(57) ABSTRACT

An improved method for forecasting and modeling product demand for a product during promotional periods. The forecasting methodology employs information about prior promotional demand forecasts, prior product sales, and the data dispersion and the number of data samples in a product class hierarchy to dynamically determine the optimal level at which to compute promotional uplift coefficients. The methodology calculates confidence values for promotional uplift coefficients for products at each level in a merchandise product hierarchy, and uses the confidence values as a filter to determine the optimal level for promotional uplift aggregation.

16 Claims, 5 Drawing Sheets

FIG. 2
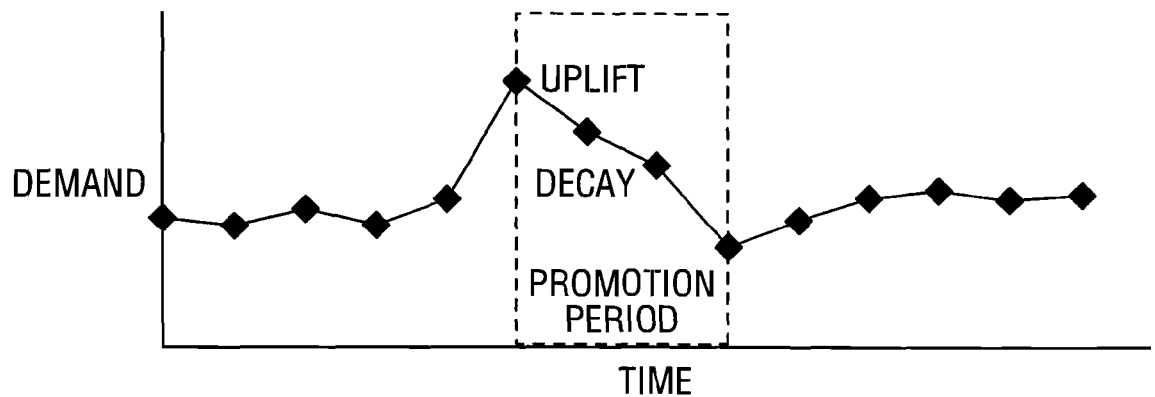
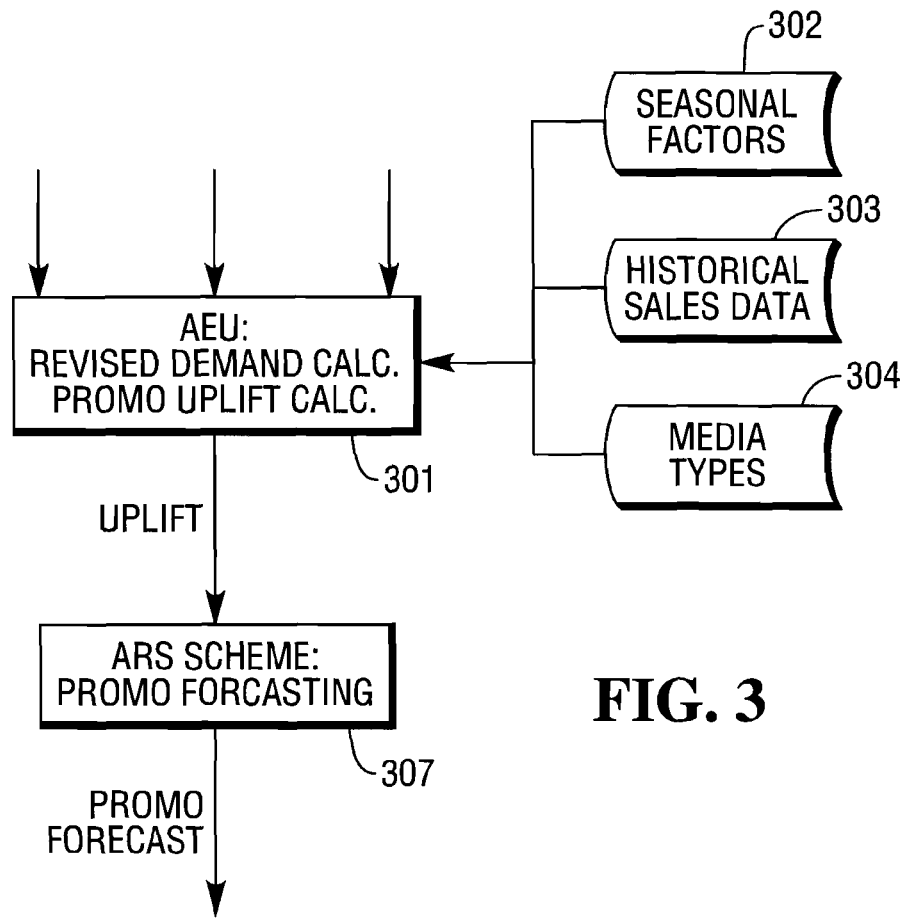
FIG. 3

METHODS AND SYSTEMS FOR FORECASTING PRODUCT DEMAND DURING PROMOTIONAL EVENTS USING STATISTICAL CONFIDENCE FILTERS

CROSS REFERENCE TO RELATED APPLICATIONS

This application claims priority under 35 U.S.C. §119(e) to the following co-pending and commonly-assigned patent application, which is incorporated herein by reference:

application Ser. No. 11/614,258, entitled "METHODS AND SYSTEMS FOR DETERMINING RELIABILITY OF PRODUCT DEMAND FORECASTS," filed on Dec. 21, 2006, by Edward Kim, Jean-Philippe Vorsanger, Jin Gao and Mahzar Khan.

FIELD OF THE INVENTION

The present invention relates to methods and systems for forecasting product demand for retail operations, and in particular to the forecasting of product demand during promotional events.

BACKGROUND OF THE INVENTION

Accurately determining demand forecasts for products are paramount concerns for retail organizations. Demand forecasts are used for inventory control, purchase planning, work force planning, and other planning needs of organizations. Inaccurate demand forecasts can result in shortages of inventory that are needed to meet current demand, which can result in lost sales and revenues for the organizations. Conversely, inventory that exceeds a current demand can adversely impact the profits of an organization. Excessive inventory of perishable goods may lead to a loss for those goods.

Teradata, a division of NCR Corporation, has developed a suite of analytical applications for the retail business, referred to as Teradata Demand Chain Management (DCM), that provides retailers with the tools they need for product demand forecasting, planning and replenishment. Teradata Demand Chain Management assists retailers in accurately forecasting product sales at the store/SKU (Stock Keeping Unit) level to ensure high customer service levels are met, and inventory stock at the store level is optimized and automatically replenished. Teradata DCM helps retailers anticipate increased demand for products and plan for customer promotions by providing the tools to do effective product forecasting through a responsive supply chain.

As illustrated in FIG. 1, the Teradata Demand Chain Management analytical application suite 101 is shown to be part of a data warehouse solution for the retail industries built upon NCR Corportion's Teradata Data Warehouse 103, using a Teradata Retail Logical Data Model (RLDM) 105. The key modules contained within the Teradata Demand Chain Management application suite 101, are:

Contribution: Contribution module 111 provides an automatic categorization of SKUs, merchandise categories and locations based on their contribution to the success of the business. These rankings are used by the replenishment system to ensure the service levels, replenishment rules and space allocation are constantly favoring those items preferred by the customer.

Seasonal Profile: The Seasonal Profile module 112 automatically calculates seasonal selling patterns at all levels of merchandise and location. This module draws on historical sales data to automatically create seasonal models for groups of items with similar seasonal patterns. The model might contain the effects of promotions, markdowns, and items with different seasonal tendencies.

Demand Forecasting: The Demand Forecasting module 113 provides store/SKU level forecasting that responds to unique local customer demand. This module considers both an item's seasonality and its rate of sales (sales trend) to generate an accurate forecast. The module continually compares historical and current demand data and utilizes several methods to determine the best product demand forecast.

Promotions Management: The Promotions Management module 114 automatically calculates the precise additional stock needed to meet demand resulting from promotional activity.

Automated Replenishment: Automated Replenishment module 115 provides the retailer with the ability to manage replenishment both at the distribution center and the store levels. The module provides suggested order quantities based on business policies, service levels, forecast error, risk stock, review times, and lead times.

Time Phased Replenishment: Time Phased Replenishment module 116 Provides a weekly long-range order forecast that can be shared with vendors to facilitate collaborative planning and order execution. Logistical and ordering constraints such as lead times, review times, service-level targets, min/max shelf levels, etc. can be simulated to improve the synchronization of ordering with individual store requirements.

Allocation: The Allocation module 115 uses intelligent forecasting methods to manage pre-allocation, purchase order and distribution center on-hand allocation.

Load Builder: Load Builder module 118 optimizes the inventory deliveries coming from the distribution centers (DCs) and going to the retailer's stores. It enables the retailer to review and optimize planned loads.

Capacity Planning: Capacity Planning module 119 looks at the available throughput of a retailer's supply chain to identify when available capacity will be exceeded.

Promotional demand forecasting is an important part of the Teradata Demand Chain Management (DCM) application suite described above. The accuracy of forecasts provided by the DCM application essentially relies on the calculation and utilization of promotional uplift coefficients to increase demand forecasts during the promotional activities. Currently promotional uplift coefficients are calculated by the Automatic Event Uplift (AEU) module, which is the core of the DCM Promotions Management module 114. AEU determines the expected regular sales for products using historical data, and then calculates a promotional uplift as the average ratio of the historical promotional demand over the revised demand. However, this method of computing promotional uplift coefficients does not account for the dispersion of the historical data, or the difference in the number of data points in a product class level.

The discussion which follows introduces a new and useful methodology that employs information about the data dispersion and the number of data samples in a product class hierarchy to dynamically determine the optimal level at which to compute the promotional uplift. The methodology calculates confidence values for promotional uplift coefficients for products at each level in a merchandise product hierarchy, and uses the confidence values as a filter to determine the optimal level for promotional uplift aggregation.

BRIEF DESCRIPTION OF THE DRAWINGS

FIG. 2 is a graph illustrating the effect of promotional activity on product demand.

FIG. 3 is a flow chart illustrating a current method for determining product demand forecasts during product promotional periods.

DETAILED DESCRIPTION OF THE INVENTION

Figure 1:
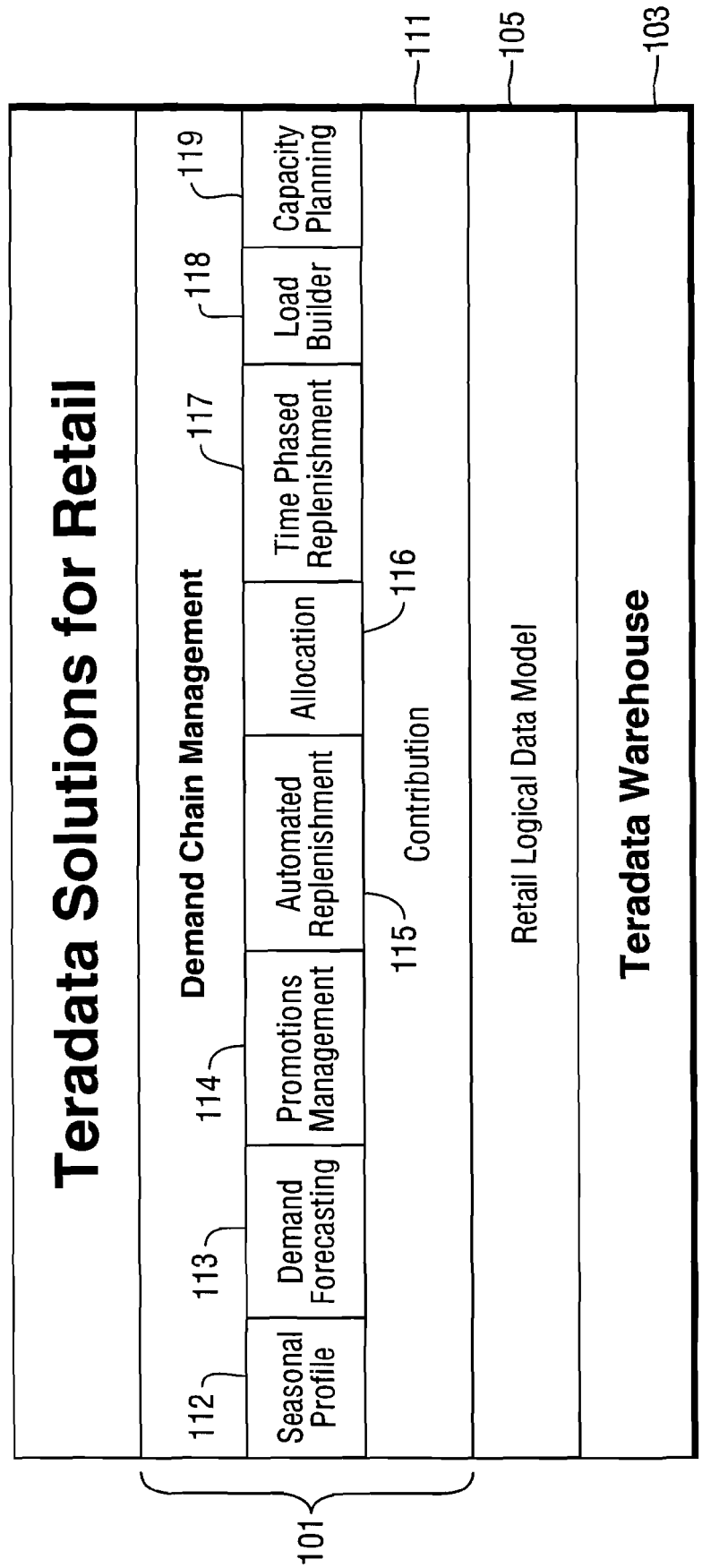
FIG. 1 provides an illustration of a forecasting, planning and replenishment software application suite for the retail industries built upon NCR Corporation's Teradata Data Warehouse.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, product data is housed in a data store. In one embodiment, the data store is a data warehouse, such as a Teradata data warehouse, distributed by NCR Corporation of Dayton, Ohio. Various data store applications interface to the data store for acquiring and modifying the product data. Of course as one of ordinary skill in the art readily appreciates, any data store and data store applications can be used with the teachings of the present disclosure. Thus, all such data store types and applications fall within the scope of the present invention.

The Teradata Demand Chain Management suites of products, as discussed above, models historical sales data to forecast future demand of products. The DCM system also generates a promotional demand forecast by multiplying a regular demand forecast by an uplift coefficient. For example, a regular, or baseline, demand forecast of 100 units with an uplift of 2.5 gives a promotional forecast of 250 units. Promotional uplift coefficients are calculated by the Automatic Event Uplift (AEU) module, which is the core of the DCM Promotions Management module 114. AEU calculates revised demand (the expected regular sales) using historical data, and then calculates a promotional uplift coefficient as the average ratio of the historical promotional demand over the revised demand.

A graph illustrating the difference in product demand over time for promotional and non-promotional periods is provided in FIG. 2. Graph 201, including graph segments 203 and 205, illustrates the regular sales activity for an exemplary product. Promotional product sales activity is represented by graph segments 207 and 209. The increase in demand over regular sales activity during the promotional periods represented by graph section 207 and 209 is referred to as the promotional uplift.

FIG. 3 is a simple flow chart illustrating a current method for determining product demand forecasts during product promotional periods. As part of the DCM demand forecasting process, historical price and sales data 301 is saved for each product or service offered by a retailer. In step 301, the Automatic Event Uplift (AEU) module, a core component of the DCM Promotion Manager module 114, calculates the revised demand (the expected regular sales) for a product sold by the retailer using the historical data 303, and then calculates the promotional uplift coefficient as the average ratio of the historical promotional demand over the revised demand.

In step 307, the promotional uplift is then input into the DCM Average Rate of Sale (ARS) calculations performed within the Demand Forecasting module 113 to estimate the promo demand using the future promotional calendar of events.

Merchandise Hierarchy

Typically, a retailer maintains a merchandise hierarchy wherein goods and services provided by the retailer are grouped together by common characteristics, for example, women's fashion, office equipment, or kitchen products. These groups are used as the basis for inventory management, planning, controlling, profitability analyses, and evaluations.

Merchandise categories allow a retailer to classify and structure the entire range of goods offered for sale by the retailer. Every product or service is assigned to a single merchandise category across a whole company. Merchandise categories can be assigned to stores and store departments. A successfully implemented merchandise category hierarchy is an essential tool for efficient merchandise category management.

Figure 4:
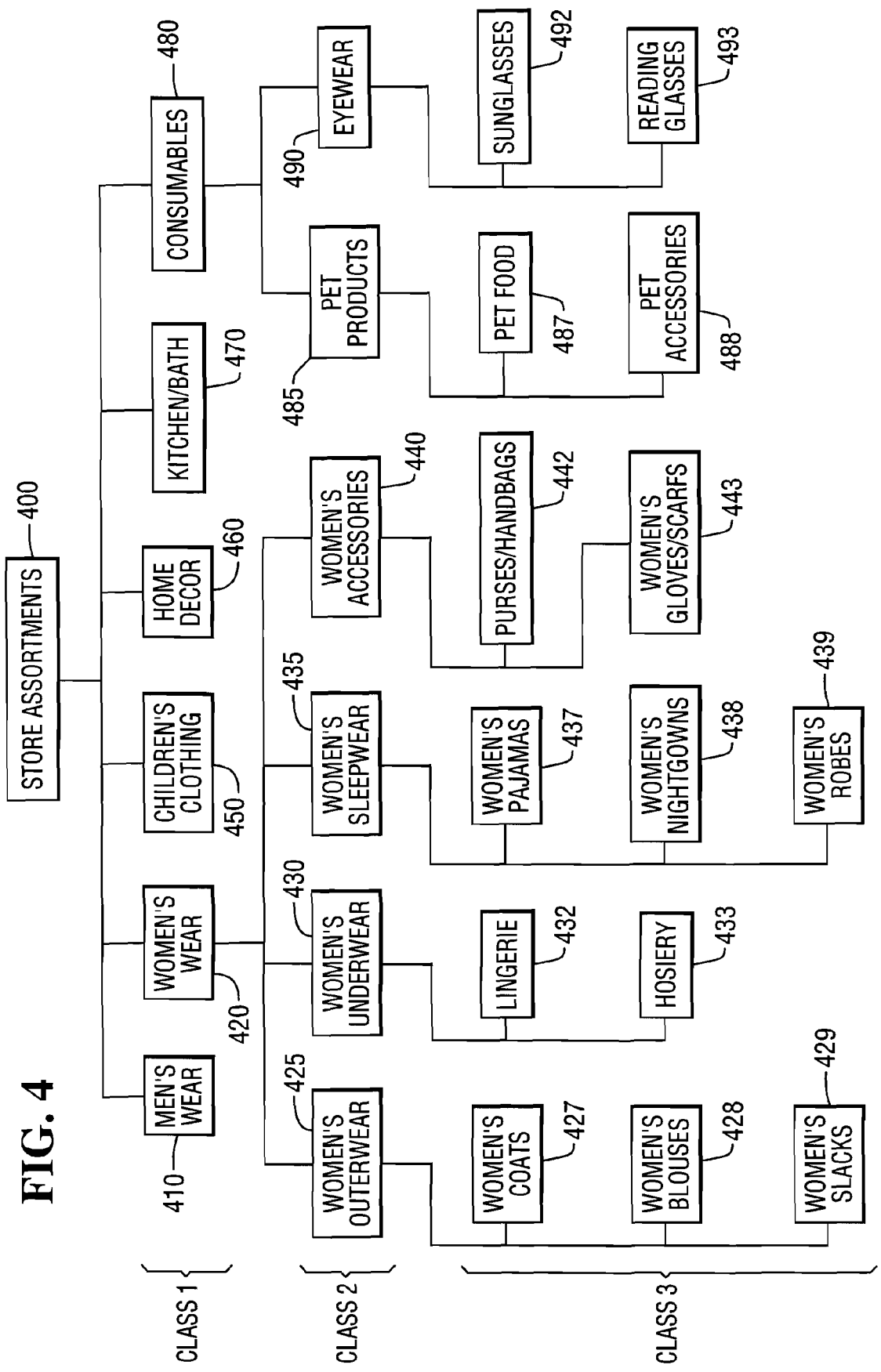
FIG. 4 provides an illustration of an exemplary merchandise hierarchy for a department store.

FIG. 4 provides an illustration of an exemplary merchandise hierarchy for a department store. Three levels of a merchandise hierarchy are illustrated, with each lower level in the hierarchy containing more specific product groupings. The topmost level of the hierarchy, class 1, includes the broad product categories Men's Wear 410, Women's Wear 420, Children's Clothing 450, Home Décor 460, Kitchen/Bath 470 and Consumables 480. Portions of a second level of the hierarchy, identified as class 2, are illustrated for the Women's Wear 420 and Consumables 480 class 1 product categories. Class 2 product categories under Women's Wear 420 include Women's Outerwear 425, Women's Underwear 430, Women's Sleepwear 435 and Women's Accessories 440. Class 2 product categories under Consumables 480 include Pet Products 485 and Eyewear 490.

Example class 3 product categories are provided under each of the class 2 categories shown. For example, class 3 product categories included in Women's Outerwear 425 include Women's Coats 427, Women's Blouses 428 and Women's Slacks. The class 1, 2 and 3 categories shown in FIG. 4 are for illustration only. An actual merchandise hierarchy for a retail business may or may not include the merchandise classes and groups illustrated, and may include additional merchandise categories not shown. Additional, more specific, merchandise class categories may be included below class 3. All products offered for sale by the retailer are represented within at least one of the lowest level merchandise class categories within the merchandise hierarchy.

As stated earlier, historical demand data is saved for each product or service offered by a retailer as part of the demand forecasting process. This historical demand data, and other information derived therefrom, may be saved for individual products and also for all products within a merchandise group.

The improved promotional demand forecasting technique described herein calculates promotional uplift coefficients and confidence values for products at each level of the merchandise hierarchy, then selects the promotional uplift coefficient at the merchandise hierarchy level at which confidence is optimal for use in product promotional demand forecasting.

The DCM Automatic Event Uplift (AEU) module calculates uplift coefficients which are multiplicative factors applied to the forecasted regular demand of a product to determine the promotional demand for the first week of the future promotion in accordance with equation 1, provided below:

$$\text{promo\_demand}_1 = \text{uplift\_coefficent} * \text{revised\_demand} \quad (\text{EQN 1})$$

The promotional demand value represents the elevated demand due to the product being on promotion, and the revised demand value is the estimated level of demand of the same product not on promotion. The AEU module calculates uplift coefficients at the lowest location and product classification level and rolls up these values to all location and classification levels.

Currently, the AEU module employs a weighted arithmetic mean to forecast uplift coefficients in accordance with equation 2, provided below. Uplift coefficients collected from historical promotional sales data are used to calculate an average uplift. The corresponding average demand is used to appropriately weigh the coefficients to arrive at a weighted average.

$$\text{uplift\_coefficient} = \frac{\sum_{i=1}^{n} \text{demand}_i * \text{uplift\_coefficient}_i}{\sum_{i=1}^{n} \text{demand}_i} \quad (\text{EQN 2})$$

Statistical Confidence Filtering

This enhancement to the AEU module has been developed to collect the statistical confidence of the weighted average uplift. The confidence interval is calculated in accordance with equation 3, provided below, and then taken as a percentage of the uplift, as determined in accordance with equation 4 to allow for direct comparison between confidence values. The resulting confidence interval percentage value, determined in accordance with equation 5, is used to determine the optimal uplift factor to minimize error. Lower values represent higher confidence levels. The calculated uplift coefficients are filtered based on a confidence threshold and an algorithm which detects the level at which confidence is optimal as it progresses up the classification level hierarchy. The filter eliminates any uplifts with unfavorable confidence values, retaining the desired uplifts for use in AEU promotional forecast calculations.

$$\text{confidence\_interval} = \frac{2 * \text{stddev}(\text{uplift\_coefficient})}{\sqrt{n}} \quad (\text{EQN 3})$$

$$\text{uplift} = \frac{\sum_{i=1}^{n} (\text{demand}_i * \ln(\text{uplift\_coefficient}_i))}{\sum_{i=1}^{n} \text{demand}_i} \quad (\text{EQN 4})$$

$$\text{confidence\_interval\_percentage} = \frac{\text{confidence\_interval}}{\text{uplift}} \quad (\text{EQN 5})$$

Figure 5:
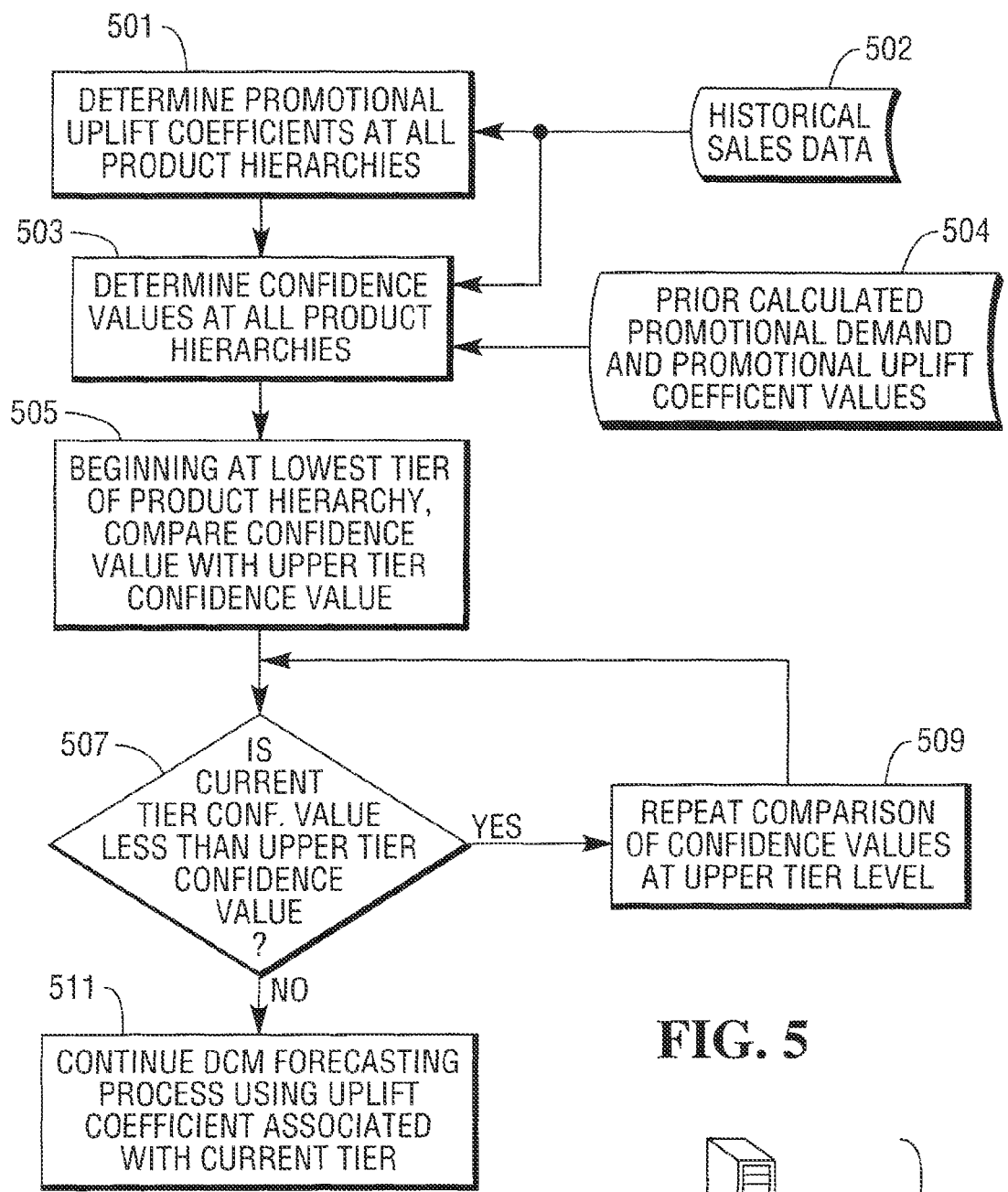
FIG. 5 is a flow chart illustrating an improved method for determining product demand forecasts during promotional periods in accordance with the present invention.
Figure 5:
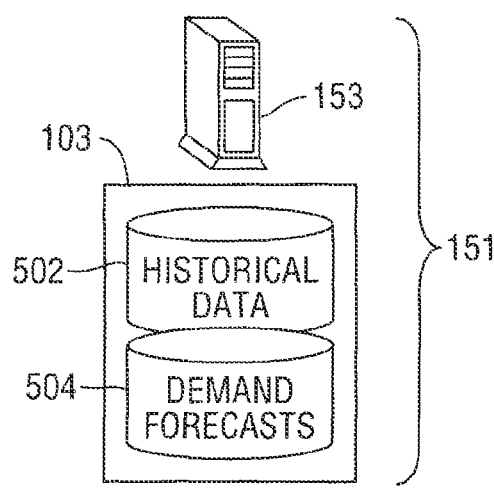

Referring to the flow chart illustrated in FIG. 5 and merchandise hierarchy shown in FIG. 6, a process for filtering promotional uplift coefficient values by confidence values will now be explained. The described process is executed by the Teradata Demand Chain Management system 151, on a server computer 153 utilizing actual historical sales data 502 and prior calculated promotional demand and promotional uplift coefficient values 504 saved within data warehouse 103. Beginning in step 501, promotional uplift coefficients are calculated from historical data 502 for all products and product groups at each level of the merchandise hierarchy. Similarly, in step 503 confidence values are calculated corresponding to each of the promotional uplift coefficients from a comparison of prior calculated promotional demand and promotional uplift coefficient values 504 with actual historical sales data 502.

Initially, all uplifts with confidence values lower than a predetermined confidence threshold are accepted. In this embodiment, the threshold has been empirically determined to be 0.30. In addition, all uplift coefficient values at the highest level, class 1 in FIG. 6, are accepted.

In steps 505 through 509, and beginning at the lowest class level, class 4 in FIG. 4, the confidence value for each product, or product group, at the current level is compared with the confidence value for the broader product group at the immediately higher level. For example, the confidence level for the product grouping J at class 4 in FIG. 6 is compared with the confidence value for the product grouping I at class 3. If there is an increase in confidence value from one level to the next level, the lower level uplift is accepted. If there is a decrease in the confidence level, the comparison is repeated at the next higher level, e.g., the confidence level for the product grouping I at class 3 is compared with the confidence value for the product grouping H at class 2.

Figure 6:
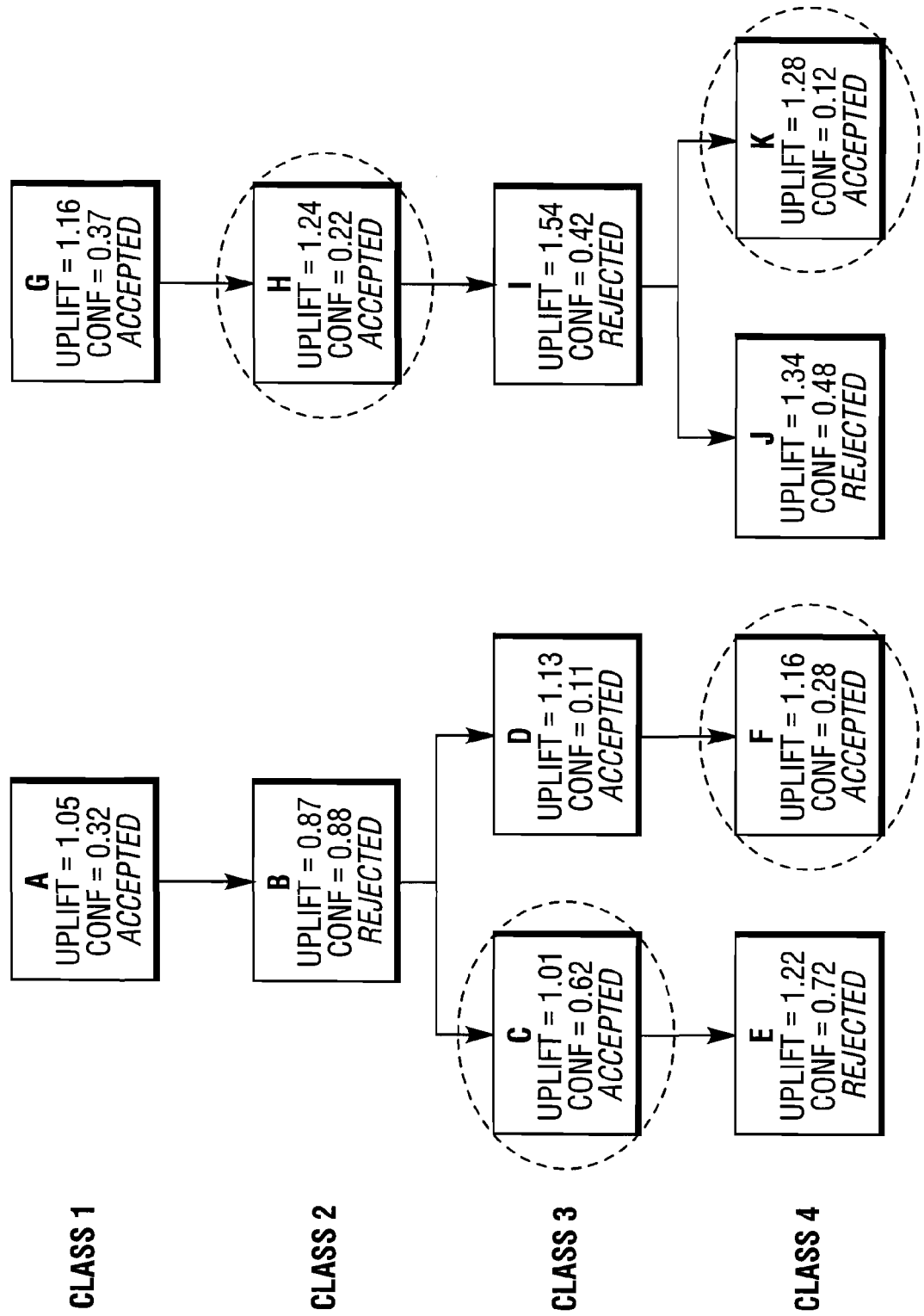
FIG. 6 provides an illustration of a merchandise hierarchy including uplift coefficients and confidence values for each level of the hierarchy in accordance with the present invention.

FIG. 6 displays an example of how uplift coefficients are filtered using the method described above. FIG. 6 provides an illustration of a merchandise hierarchy including four levels. The topmost level of the hierarchy, class 1, includes the broadest product categories. Additional, increasingly specific, merchandise class categories are provided in classes 2 through 4. Uplifts D, F, H and K are accepted initially because they have confidence interval percentage values lower than the confidence threshold of 0.3. Uplifts A and G are at class level 1 in the classification hierarchy and are also accepted.

Beginning with each class 4 uplift having a confidence level above 0.3, and moving up the product hierarchy, confidence levels are compared to identify the uplifts to be used in AEU promotional forecasts. For example, the confidence level associated with uplift E, 0.72, in class 4, is compared against the confidence value associated with uplift C, 0.62. As uplift C has a lower confidence interval than uplift E, uplift C is accepted over uplift E and a comparison between the confidence values for uplifts C, at 0.62, and B, at 0.88, is conducted. Upon comparing uplift C against B, uplift C remains the best choice so the product hierarchy traversal is terminated and uplift C is finally accepted for use in AEU forecast calculations involving products associated with groups C and E. Similarly, uplift H with is accepted for use in AEU calculations for group J.

Conclusion

The Figures and description of the invention provided above reveal a novel system and method that employs information about prior promotional demand forecasts, prior product sales, and the data dispersion and the number of data samples in a product class hierarchy to dynamically determine the optimal level at which to compute promotional uplift coefficients. The methodology calculates confidence values for promotional uplift coefficients for products at each level in a merchandise product hierarchy, and uses the confidence values as a filter to determine the optimal level for promotional uplift aggregation. The foregoing description of various embodiments of the invention has been presented for purposes of illustration and description. It is not intended to be exhaustive or to limit the invention to the precise form disclosed. Many alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. A computer-implemented method for forecasting promotional demand for a product, the method comprising the steps of:
   (a) maintaining, in a data warehouse, a database of historical product demand information for a plurality of products;
   (b) maintaining, in said data warehouse, a database of prior calculated promotional demand forecast values and prior calculated promotional uplift coefficient values for said plurality of products;
   (c) analyzing, by a computer in communication with said data warehouse, said historical product demand information to determine expected regular sales and promotional uplift coefficients for said plurality of products at each level in a product hierarchy;
   (d) analyzing, by said computer, said historical product demand information, said prior calculated promotional demand forecast values, and said prior calculated promotional uplift coefficient values to determine confidence values corresponding to each promotional uplift coefficient determined in step (c);
   (e) selecting, by said computer, an optimal confidence value for said product from the confidence values at each level in said product hierarchy containing said product; and
   (f) determining, by said computer, a promotional forecast for said product by combining the expected regular sales for said product and the uplift coefficient corresponding to the optimal confidence value selected in step (e).

2. The computer-implemented method for forecasting promotional demand for a product in accordance with claim 1, wherein:
   said plurality of products are grouped together by common characteristics within said product hierarchy;
   said product hierarchy comprises multiple levels, with higher levels in said product hierarchy containing broad product groupings, and lower levels in the product hierarchy containing more specific product groupings; and
   said uplift coefficients and said confidence values are calculated for each product grouping at each level in said product hierarchy by averaging the uplift coefficients and confidence values for all products included within each product grouping.

3. The computer-implemented method for forecasting promotional demand for a product in accordance with claim 2, wherein:
   said product is included in a product grouping in each level of said product hierarchy.

4. The computer-implemented method for forecasting promotional demand for a product in accordance with claim 1, wherein said step of analyzing said historical product demand information to determine the promotional uplift coefficients for said plurality of products at each level in a product hierarchy comprises:
   determining an increase in demand for said products during prior promotional periods over the demand for said products during prior non-promotional periods.

5. The computer-implemented method for forecasting promotional demand for a product in accordance with claim 1, wherein said step of analyzing said historical product demand information, said prior calculated promotional demand forecast values, and said prior calculated promotional uplift coefficient values to determine confidence values corresponding to each promotional uplift coefficient comprises:
   determining a percentage difference between demand forecasts for said products during prior promotional periods and actual demand for said products during prior said prior promotional periods.

6. The computer-implemented method for forecasting promotional demand for a product in accordance with claim 5, wherein said step of selecting an optimal confidence value for said product from the confidence values at each level in said product hierarchy containing said product comprises:
   selecting as said optimal confidence value for said product, the confidence value for said product having the lowest percentage difference between demand forecasts for said product during prior promotional periods and actual demand for said product during prior said prior promotional periods.

7. The computer-implemented method for forecasting promotional demand for a product in accordance with claim 3, wherein said step of selecting an optimal confidence value for said product from the confidence values at each level in said product hierarchy containing said product comprises:
   beginning at the lowest level of said product hierarchy, successively comparing the confidence value for said product grouping including said product with the confidence value for said product grouping including said product at the next-higher level in said product hierarchy.

8. The computer-implemented method for forecasting promotional demand for a product in accordance with claim 7, further comprising the step of:
   establishing a threshold confidence value; and
   selecting as said optimal confidence value for said product, the confidence value associated with said product at the lowest level in said product hierarchy which does not exceed said threshold confidence value.

9. A system for forecasting promotional demand for a product, comprising:
   a data warehouse containing an electronic database of historical product demand information for a plurality of products, prior calculated promotional demand forecast values and prior calculated promotional uplift coefficient values for said plurality of products; and
   a computer in communication with said data warehouse, said computer executing a product forecasting application for:
   analyzing said historical product demand information to determine expected regular sales and promotional uplift coefficients for said plurality of products at each level in a product hierarchy;
   analyzing said historical product demand information, said prior calculated promotional demand forecast values, and said prior calculated promotional uplift coefficient values to determine confidence values corresponding to each promotional uplift coefficient;
   selecting an optimal confidence value for said product from the confidence values at each level in said product hierarchy containing said product; and determining a promotional forecast for said product by combining the expected regular sales for said product and the uplift coefficient corresponding to said optimal confidence value.

10. The system for forecasting promotional demand for a product in accordance with claim 1, wherein:
   said plurality of products are grouped together by common characteristics within said product hierarchy;
   said product hierarchy comprises multiple levels, with higher levels in said product hierarchy containing broad product groupings, and lower levels in the product hierarchy containing more specific product groupings; and
   said uplift coefficients and said confidence values are calculated for each product grouping at each level in said product hierarchy by averaging the uplift coefficients and confidence values for all products included within each product grouping.

11. The system for forecasting promotional demand for a product in accordance with claim 10, wherein:
   said product is included in a product grouping in each level of said product hierarchy.

12. The system for forecasting promotional demand for a product in accordance with claim 9, wherein analyzing said historical product demand information to determine the promotional uplift coefficients for said plurality of products at each level in a product hierarchy comprises:
   determining an increase in demand for said products during prior promotional periods over the demand for said products during prior non-promotional periods.

13. The system for forecasting promotional demand for a product in accordance with claim 9, wherein analyzing said historical product demand information, said prior calculated promotional demand forecast values, and said prior calculated promotional uplift coefficient values to determine confidence values corresponding to each promotional uplift coefficient comprises:
   determining a percentage difference between demand forecasts for said products during prior promotional periods and actual demand for said products during prior said prior promotional periods.

14. The system for forecasting promotional demand for a product in accordance with claim 13, wherein selecting an optimal confidence value for said product from the confidence values at each level in said product hierarchy containing said product comprises:
   selecting as said optimal confidence value for said product, the confidence value for said product having the lowest percentage difference between demand forecasts for said product during prior promotional periods and actual demand for said product during prior said prior promotional periods.

15. The system for forecasting promotional demand for a product in accordance with claim 11, wherein selecting an optimal confidence value for said product from the confidence values at each level in said product hierarchy containing said product comprises:
   beginning at the lowest level of said product hierarchy, successively comparing the confidence value for said product grouping including said product with the confidence value for said product grouping including said product at the next-higher level in said product hierarchy.

16. The computer-implemented method for forecasting promotional demand for a product in accordance with claim 15, further comprising the step of:
   establishing a threshold confidence value; and
   selecting as said optimal confidence value for said product, the confidence value associated with said product at the lowest level in said product hierarchy which does not exceed said threshold confidence value.

* * * * *